(12) United States Patent
Kling et al.

(10) Patent No.: US 8,158,690 B2
(45) Date of Patent: Apr. 17, 2012

(54) TEMPERATURE-SENSITIVE ACTIVE INGREDIENT COMPOSITIONS FOR REDUCING THE DENSITY OF PLASTICS

(75) Inventors: Reinhold Kling, Gersthofen (DE); Jan-Erik Wegner, Hamburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 454 days.

(21) Appl. No.: 12/443,398

(22) PCT Filed: Sep. 26, 2007

(86) PCT No.: PCT/EP2007/008366
§ 371 (c)(1), (2), (4) Date: Mar. 27, 2009

(87) PCT Pub. No.: WO2008/037445
PCT Pub. Date: Apr. 3, 2008

(65) Prior Publication Data
US 2010/0004347 A1    Jan. 7, 2010

(30) Foreign Application Priority Data
Sep. 30, 2006  (DE) .......................... 10 2006 046 566

(51) Int. Cl.
*C08J 9/18*   (2006.01)
*C08J 9/04*   (2006.01)
(52) U.S. Cl. ............... 521/56; 521/76; 521/94; 521/142
(58) Field of Classification Search ............ 521/56, 521/76, 94, 142
See application file for complete search history.

(56) References Cited

U.S. PATENT DOCUMENTS

| | | | |
|---|---|---|---|
| 4,632,942 A | | 12/1986 | Ito et al. |
| 4,695,594 A | * | 9/1987 | Pressman ................. 521/92 |
| 5,611,962 A | | 3/1997 | Garcia et al. |
| 5,895,614 A | * | 4/1999 | Rivera et al. ................ 264/50 |
| 6,143,846 A | | 11/2000 | Herrmann et al. |
| 6,239,187 B1 | * | 5/2001 | Hatke et al. ................ 521/150 |
| 6,331,590 B1 | | 12/2001 | Herrmann et al. |
| 2002/0198122 A1 | | 12/2002 | Nitzsche |
| 2004/0214927 A1 | | 10/2004 | Nitzsche |
| 2010/0093906 A1 | | 4/2010 | Kling |

FOREIGN PATENT DOCUMENTS

| | | |
|---|---|---|
| CA | 2135600 | 11/1993 |
| EP | 0143545 | 6/1985 |
| EP | 0890584 | 3/1988 |
| EP | 0260445 | 3/1998 |
| JP | 10212372 | 8/1998 |
| WO | WO 97/07907 | 3/1997 |
| WO | WO 97/16476 | 5/1997 |

OTHER PUBLICATIONS

PCT International Search Report for PCT/EP 2007/008366; mailed Jan. 2, 2008.
Clariant Lilocene Grades—The "Designer Waxes" [on line] XP002461549, pp. 1 and 2, (Jul. 2006).
English Abstract for JP 10212372, Aug. 11, 1998.

* cited by examiner

*Primary Examiner* — Timothy J. Kugel
(74) *Attorney, Agent, or Firm* — Anthony A. Bisulca

(57) ABSTRACT

The invention relates to an active ingredient composition which has a high content in thermosensitive foaming agents and one or more polyolefin resins, the portion which is larger in quantity being a metallocene and optionally the remaining resins being polar or nonpolar nonmetallocene polyolefin resins. All polyolefin resins add up to at least 10% by weight of the formulation and have a melting point between 80 and 170° C. The reduced dust active ingredient composition according to the invention is used for the masterbatch production of foamed plastics.

25 Claims, No Drawings

TEMPERATURE-SENSITIVE ACTIVE INGREDIENT COMPOSITIONS FOR REDUCING THE DENSITY OF PLASTICS

The present invention relates to highly loaded, thermosensitive active ingredient compositions which comprise blowing agents, which lead to density reduction in plastics.

Plastics are usually foamed by using blowing agent masterbatches. The blowing agent masterbatches, produced by the extrusion process, have blowing agent contents in the range from 10 to 75% by weight, and often comprise, alongside a polymeric carrier, a high proportion of polyolefinic waxes, which promote the process of incorporation of the agents into the plastics matrix and maximize uniformity of dispersion of the blowing agents.

Concentrates of this type are subject to stringent industrial requirements: the blowing agents should have ideal distribution, the fineness of the cell structure formed has to be maximized, the carrier has to have ideal compatibility with the polymer, and most importantly premature foaming in the processing machine has to be inhibited.

The following single- or multistage processes are currently known for the production of dust-free blowing agent masterbatches and blowing agent preparations, composed of pellets or of powder.

A cold mix is often used, composed of a suitable polymer carrier, such as polyethylene, polypropylene, or ethylene-vinyl acetate copolymer, or of similar polymers, and which can also comprise dispersing agents, such as waxes, fatty acid derivatives, stearates, etc. The disadvantage of these polymer mixtures is that the polymeric fraction can often cause the critical melt temperature of the blowing agents to be exceeded, the result being that the decomposition temperature of the blowing agent is reached or exceeded. There are great restrictions on compatibility with different polymers.

JP 10212372 describes the production of an expandable masterbatch composed of a tack-free polymer, produced using a catalyst. The catalyst used can be a composite of catalysts from group 4. The proportion used of the expandable microsphere products was 30%.

U.S. Pat. No. 5,611,962 and CA 2135600 describe the production of chemical blowing agent concentrates based on polymers whose melting point is above 149° C.

U.S. Pat. No. 4,632,942 and EP 0 143 545 describe the characteristic of carrier polymers for the production of blowing agent concentrates.

All of the blowing agent preparations used in industry hitherto and having high blowing agent content, more than 40%, have to be produced using relatively complicated processing equipment, e.g. an underwater pelletizer. The high loading actually reduces the extrudate strength of the masterbatches produced. Masterbatch companies currently use strand pelletizers. One possibility for improvement would theoretically be the use of specific free-flowing polymers which are processable at lower temperatures, thus preventing premature triggering of the blowing agent, where these would have good compatibility with different polymers. However, polymers having this property profile are relatively expensive.

The production quantities required for cost-effective production using underwater pelletization and the equipment necessary for this process are generally relatively large. Production of specific active ingredient compositions comprising blowing agents matched to the individual customer requirements is therefore costly and cannot achieve conventional high concentrations.

The object of the present invention was to maximize the loading content of a very wide variety of blowing agents in active ingredient compositions which comprise blowing agents and which are used for polymer processing, thus permitting production of foamed plastomers and elastomers in a manner which is economically and environmentally advantageous, with a unitary active ingredient composition or active ingredient preparation, and thus providing high-quality products.

The intention here is very substantially to avoid use of any polymeric carrier, thus permitting firstly production of preparations with markedly higher active substance content and secondly use of these in significantly more different polymers than hitherto, with varying chemical composition, since the high loading reduces the extent of compatibility problems. The wax carrier is moreover intended to permit easier incorporation and dispersion into the polymers, with the result that cell structure is finer or that molecular or molecular-weight distribution is less polydisperse.

The invention achieves this object by incorporating the blowing agent components into a metallocene wax or a mixture of metallocene wax with Ziegler wax, or a wax-polymer mixture. The main constituent of the wax carrier is a metallocene wax. Metallocene waxes or metallocene-polyolefin waxes are defined as waxes produced in the presence of metallocene as catalyst. The resulting composition is compounded by extrusion to give the active ingredient composition of the invention.

The invention therefore provides an active ingredient composition or active ingredient preparation of the type mentioned above, comprising
i) one or more finely dispersed blowing agents,
ii) one or more metallocene polyolefin waxes,
iii) optionally one or more waxes selected from polar and nonpolar non-metallocene polyolefin waxes, and
iv) if appropriate, one or more homo- and/or copolymers of ethylene and/or of propylene,
where the composition comprises an amount of at least 5 to 90% by weight of the blowing agent and at least 10% by weight of the polyolefin wax ii).

It is preferable that the wax fraction comprises at least 50% by weight of polypropylene metallocene wax, based on the weight of the wax fraction.

The active ingredient composition of the invention therefore has particularly high blowing agent content and filler content, and has very good compatibility with the polymers used, and very substantially avoids impairment of mechanical properties in the final product.

The melt viscosity of the metallocene waxes, measured at a temperature of 170° C., is in the range from 40 to 80 000 mPa·s, preferably from 45 to 35 000 mPa·s, in particular from 50 to 10 000 mPa·s.

All of the waxy constituents of the active ingredient composition melt in the temperature range from 80 to 170° C.

Active ingredient compositions preferred in the invention comprise from 5 to 90% by weight, preferably from 25 to 85% by weight, of an organic or inorganic blowing agent, and from 7 to 80% by weight, preferably from 7.5 to 75% by weight, of the metallocene-polyolefin wax, and from 0 to 30% by weight, preferably from 0.5 to 25% by weight, of one or more non-metallocene waxes and/or homo- and/or copolymers of ethylene and/or of propylene. The preparation of the invention can, if necessary, also comprise an amount of from 0 to 30% by weight of fillers or additives, based on the total weight of the composition.

The waxes produced in the presence of metallocene as catalyst are preferably copolymer waxes composed of propylene and from 0.1 to 50% of ethylene and/or from 0.1 to 50% of at least one branched or unbranched 1-alkene having from 4 to 20 carbon atoms, with drop point (ring and ball) of from 80 to 170° C.

The metallocene waxes produced in the presence of metallocene as catalyst are substantially or completely amorphous and can also, if necessary, be polar-modified waxes.

For the purposes of the invention, substantially means at least 80% by weight, preferably at least 90% by weight, particularly preferably at least 95% by weight, specifically at least 99% by weight.

Particular non-metallocene polyolefin waxes are firstly ethylene-vinyl acetate waxes whose drop point is from 90 to 120° C., whose vinyl acetate content is from 1 to 30%, and whose viscosity is from 50 to 3000 mPa·s, preferably from 50 to 1500 mPa·s, measured at a temperature of 140° C., and secondly either nonpolar or polar non-metallocene waxes whose drop point is in the range from 90 to 120° C. and whose viscosity is smaller than 30 000 mPa·s, preferably smaller than 15 000 mPa·s, measured at a temperature of 140° C.

Non-metallocene polyolefin waxes that can be used are homopolymers of ethylene or of higher 1-olefins having from 3 to 10 carbon atoms, or copolymers of these. The weight-average molar mass $M_w$ of the polyolefin waxes is preferably from 1000 to 20 000 g/mol, and their number-average molar mass $M_n$ is preferably from 500 to 15 000 g/mol.

The metallocene-polyolefin waxes used in the invention are produced using metallocene compounds of the formula I.

(I)

This formula also encompasses compounds of the formula Ia

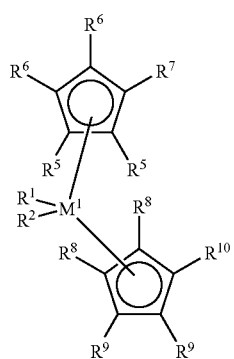

(Ia)

of the formula Ib

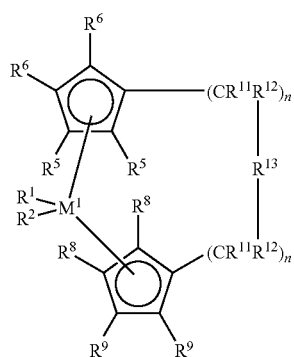

(Ib)

and of the formula Ic

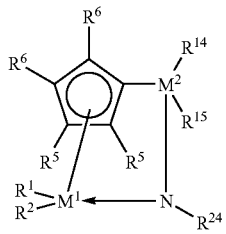

(Ic)

In the formulae I, Ia and Ib, $M^1$ is a metal of group IVb, Vb, or VIb of the Periodic Table, e.g. titanium, zirconium, hafnium, vanadium, niobium, tantalum, chromium, molybdenum, tungsten, preferably titanium, zirconium, hafnium.

$R^1$ and $R^2$ are identical or different and are a hydrogen atom, a $C_0$-$C_{10}$-alkyl group, preferably $C_1$-$C_3$-alkyl group, in particular methyl, a $C_1$-$C_{10}$-alkoxy group, preferably $C_1$-$C_3$-alkoxy group, a $C_6$-$C_{10}$-aryl group, preferably $C_6$-$C_8$-aryl group, a $C_6$-$C_{10}$-aryloxy group, preferably $C_6$-$C_8$-aryloxy group, a $C_2$-$C_{10}$-alkenyl group, preferably $C_2$-$C_4$-alkenyl group, a $C_7$-$C_{40}$-arylalkyl group, preferably $C_7$-$C_{10}$-arylalkyl group, a $C_7$-$C_{40}$-alkylaryl group, preferably $C_7$-$C_{12}$-alkylaryl group, a $C_8$-$C_{40}$-arylalkenyl group, preferably $C_8$-$C_{12}$-arylalkenyl group, or a halogen atom, preferably a chlorine atom.

$R^3$ and $R^4$ are identical or different and are a mono- or polynuclear hydrocarbon radical which can form a sandwich structure with the central atom $M^1$. $R^3$ and $R^4$ are preferably cyclopentadienyl, indenyl, tetrahydroindenyl, benzoindenyl, or fluorenyl, and the parent structures here may also bear additional substituents or may have bridging to one another. One of the radicals $R^3$ and $R^4$ may moreover be a substituted nitrogen atom, where $R^{24}$ is as defined for $R^{17}$ and is preferably methyl, tert-butyl, or cyclohexyl.

$R^5$, $R^6$, $R^7$, $R^8$, $R^9$, and $R^{10}$ are identical or different and are a hydrogen atom, a halogen atom, preferably a fluorine atom, chlorine atom, or bromine atom, a $C_1$-$C_{10}$-alkyl group, preferably $C_1$-$C_4$-alkyl group, a $C_6$-$C_{10}$-aryl group, preferably $C_6$-$C_8$-aryl group, a $C_1$-$C_{10}$-alkoxy group, preferably $C_1$-$C_3$-alkoxy group, an —$NR^{16}_2$—, —$SR^{16}$—, —$OSiR^{16}_3$—, —$SiR^{16}_3$—, or —$PR^{16}_2$-radical, where $R^{16}$ is a $C_1$-$C_{10}$-alkyl group, preferably $C_1$-$C_3$-alkyl group, or $C_6$-$C_{10}$-aryl group, preferably $C_6$-$C_8$-aryl group, or in the case of Si— or P-containing radicals, a halogen atom, preferably a chlorine atom, or any two adjacent radicals $R^5$, $R^6$, $R^7$, $R^8$, $R^9$, or $R^{10}$ form a ring with the carbon atoms connecting them. Particularly preferred ligands are the substituted compound structures derived from the parent structures cyclopentadienyl, indenyl, tetrahydroindenyl, benzoindenyl, or fluorenyl.

$R^{13}$ is

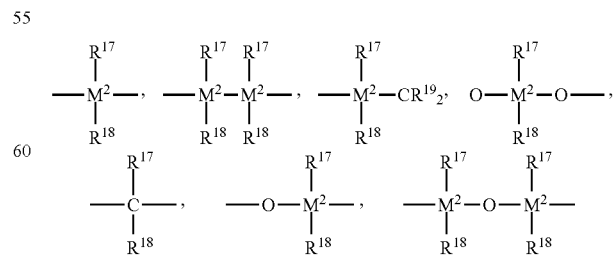

=$BR^{17}$, =$AlR^{17}$, —Ge—, —Sn—, —O—, —S—, =SO, =$SO_2$, =$NR^{17}$, =CO, =$PR^{17}$ or =$P(O)R^{17}$, where $R^{17}$, $R^{18}$, and $R^{19}$ are identical or different and are a hydrogen atom, a halogen atom, preferably a fluorine atom, chlorine atom, or bromine atom, a $C_1$-$C_{30}$-alkyl group, preferably $C_1$-$C_4$-alkyl group, in particular a methyl group, a $C_1$-$C_{10}$-fluoroalkyl group, preferably $CF_3$ group, a $C_6$-$C_{10}$-fluoroaryl group, preferably pentafluorophenyl group, a $C_6$-$C_{10}$-aryl group, preferably $C_6$-$C_8$-aryl group, a $C_1$-$C_{10}$-alkoxy group, preferably $C_1$-$C_4$-alkoxy group, in particular a methoxy group, a $C_2$-$C_{10}$-alkenyl group, preferably $C_2$-$C_4$-alkenyl group, a $C_7$-$C_{40}$-aralkyl group, preferably $C_7$-$C_{10}$-aralkyl group, a $C_8$-$C_{40}$-arylalkenyl group, preferably $C_8$-$C_{12}$-arylalkenyl group, or a $C_7$-$C_{40}$-alkylaryl group, preferably $C_7$-$C_{12}$-alkylaryl group, or $R^{17}$ and $R^{18}$, or $R^{17}$ and $R^{19}$ form a ring in each case together with the atoms connecting them.

$M^2$ is silicon, germanium, or tin, preferably silicon and germanium. $R^{13}$ is preferably $=CR^7R^8$, $=SiR^{17}R^{18}$, $=GeR^{17}R^{18}$, $-O-$, $-S-$, $=SO$, $=PR^{17}$ or $=P(O)R^{17}$.

$R^{11}$ and $R^{12}$ are identical or different and are as defined for $R^{17}$. m and n are identical or different and are zero, 1 or 2, preferably zero or 1, where m+n is zero, 1 or 2, preferably zero or 1.

$R^{14}$ and $R^{15}$ are as defined for $R^{17}$ and $R^{18}$.

Examples of suitable metallocenes are:
bis(1,2,3-trimethylcyclopentadienyl)zirconium dichloride,
bis(1,2,4-trimethylcyclopentadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methylcyclopentadienyl)zirconium dichloride,
bis(2-methyl-4,6-diisopropylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride,
bis(trimethylsilylcyclopentadienyl)zirconium dichloride,
biscyclopentadienyldibenzylzirconium,
biscyclopentadienyidimethylzirconium,
bistetrahydroindenylzirconium dichloride,
dimethylsilyl-9-fluorenylcyclopentadienylzirconium dichloride,
dimethylsilylbis-1-(2,3,5-trimethylcyclopentadienyl)zirconium dichloride,
dimethylsilylbis-1-(2,4-dimethylcyclopentadienyl)zirconium dichloride,
dimethylsilylbis-1-(2-methyl-4,5-benzoindenyl)zirconium dichloride,
dimethylsilylbis-1-(2-methyl-4-ethylindenyl)zirconium dichloride,
dimethylsilylbis-1-(2-methyl-4-isopropylindenyl)zirconium dichloride,
dimethylsilylbis-1-(2-methyl-4-phenylindenyl)zirconium dichloride,
dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenyidimethylzirconium,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzoindenyl)zirconium dichloride,
ethylenebis-1-(2-methyl-4-phenylindenyl)zirconium dichloride,
ethylenebis-1-(2-methyltetrahydroindenyl)zirconium dichloride,
ethylenebis-1-(4,7-dimethylindenyl)zirconium dichloride,
ethylenebis-1-indenylzirconium dichloride,
ethylenebis-1-tetrahydroindenylzirconium dichloride,
indenylcyclopentadienylzirconium dichloride,
isopropylidene(1-indenyl)(cyclopentadienyl)zirconium dichloride,
isopropylidene(9-fluorenyl)(cyclopentadienyl)zirconium dichloride,
phenylmethylsilylbis-1-(2-methylindenyl)zirconium dichloride,
and also each of the alkyl or aryl derivatives of these metallocene dichlorides.

Suitable cocatalysts are used to activate the single-center catalyst systems. Suitable cocatalysts for metallocenes of the formula I are organoaluminum compounds, in particular aluminoxanes, or else aluminum-free systems, such as $R^2 \text{ x } NH_{4-x}BR^{21}_4$, $R^{20}PH_{4-x}BR^{21}_4$, $R^{23}CBR^{21}_4$ or $BR^{21}_3$. x in these formulae is a number from 1 to 4, and the radicals $R^{20}$ are identical or different, preferably identical, and are $C_1$-$C_{10}$-alkyl or $C_6$-$C_{18}$-aryl, or two radicals $R^{20}$ form a ring together with the atom connecting them, and the radicals $R^{21}$ are identical or different, preferably identical, and are $C_6$-$C_{18}$-aryl, which may have substitution by alkyl, by haloalkyl, or by fluorine. In particular, $R^{20}$ is ethyl, propyl, butyl, or phenyl, and $R^{21}$ is phenyl, pentafluorophenyl, 3,5-bistrifluoromethylphenyl, mesityl, xylyl, or tolyl.

A third component is also often required in order to maintain protection from polar catalyst poisons. Organoaluminum compounds are suitable for this purpose, examples being triethylaluminum, tributylaluminum, and others, and also mixtures.

As a function of the process, it is also possible to use supported single-center catalysts. Preference is given to catalyst systems in which the residual contents of support material and cocatalyst do not exceed a concentration of 100 ppm in the product.

Determination methods used here are: melt viscosities to DIN 53019 using a rotary viscometer, drop points to DIN 51801/2, and softening points by ring/ball to DIN EN 1427. Drop point is determined using Ubbelohde drop-point equipment to DIN 51801/2, and softening point using ring/ball equipment to DIN EN 1427.

The compositions of the invention can, as mentioned above, also comprise fillers, such as silicates, silicas, zeolites, e.g. aluminum silicates, sodium silicates, calcium silicates, chalk, talc, or else auxiliaries, e.g. antistatic agents, stearates, antioxidants, slip agents, and/or suspension stabilizers, colorants, flame retardants, antiblocking agents, potash, and alkaline earth metal oxides.

Examples of blowing agents that can be used are azodicarbonamides, nitroso compounds, hydrazides, and citric acid, and also citric acid derivatives, citric salts, and citric esters, sodium hydrogencarbonate, or a mixture thereof. The compounds most often used are those known as modified azodicarbonamides, these being azodicarbonamides in conjunction with kickers, such as ZnO, zinc stearate, or with lead salts. However, it is also possible to use combinations with organic substances, e.g. acids and bases. Other exothermic blowing agents would be 4,4'-oxybis(benzenesulfonyl hydrazide), 5-phenyltetrazole, p-tolylenesulfonyl semicarbazide, or p-tolylenesulfonyl hydrazide, which can be used with advantage. Other possible blowing agents are low-boiling-point liquids, such as isopentane or isooctane, and also microspheres which have a polymeric shell and which have a filling of gases or of low-boiling-point liquids.

The required proportion of metallocene waxes depends on additive-matrix inter-reaction, on the surface structure of the blowing agent, on the surface structure of the finished item, on the desired cell structure, on the triggering temperature (gas-evolution temperature) of the blowing agent used, and also on the desired amount to be used of the end product.

The present invention also provides a process for the production of the composition of the invention by combining the individual constituents and subsequent homogenization in an extruder or kneader. Preference is given here to the premixing of the individual components during production of the composition, and this can take place in a suitable mixing apparatus. However, it is also possible that the addition of further additives is delayed until later and achieved, in solid or liquid form, by way of a side feed.

The raw materials used can take a very wide variety of forms. The form taken by the waxes, and also the further additives, in the mixture can by way of example be that of pellets, of flake, or of very fine powder or of other types of powder, while the blowing agent can also be present in liquid form.

The following single- or multistage processes are currently known for the production of dust-free active ingredient compositions in the form of pellets or powder with high loadings:

All of the components can be mixed cold, addition taking place by way of the main feed of an extruder, or the waxy/polymeric fractions of the formulation can be introduced by way of the main feed of the extruder, the pulverulent or liquid blowing agents being introduced into the machine by way of appropriate side feeds. Mixing in the melt can then be carried out in a suitable extruder or in kneaders. This is followed by pelletization, milling, or spraying.

A cold mix is composed of suitable polymeric carriers, such as polyethylene, polypropylene, or ethylene-vinyl acetate. The disadvantage of such polymer mixtures is that they often have limited compatibility of individual components, a possible result then being separation of polymer and the additives, such as the blowing agents.

In the case of mixing at an elevated temperature, the thermal energy can be introduced by way of friction, or by way of separate heating of the mixing vessel, or by both methods.

In the case of production of the composition in an extruder, it is preferable to operate with a screw structure matched to the high active ingredient content. The temperature profile is preferably lower than stated in the prior art. Production of the compositions of the invention advantageously uses a strand pelletizer, but it is also possible to use an underwater pelletizer or die-face pelletizer.

The compositions of the invention lead to a reduction of density of semi-synthetic or synthetic polymers, and are therefore used in particular for the production of foamed plastics or plastics articles.

Unlike the compositions described in the prior art and comprising blowing agents, the products of the invention can be used to foam a wide selection of polymers. Examples that may be mentioned are: polyolefins and copolymers of PE, polyvinyl chloride (PVC) in the form of unplasticized PVC or in the form of plasticized PVC, ethylene-vinyl acetate copolymers (EVA), polystyrene (PS), styrene-acrylonitrile copolymers (SAN), acrylonitrile-butadiene-styrene copolymers (ABS), polyethylene glycol terephthalate (PET), polybutylene glycol terephthalate (PBT), and copolyesters of these, and also polycarbonate (PC), butyl rubber and other rubbers, bitumen, and also blends, such as PC/ABS (acrylonitrile-styrene-acrylate terpolymer), PC/PBT, or PC/ASA, and PMMA (polymethyl methacrylate), and also thermoplastic polyurethanes (TPU) and also certain specialty polymers.

After blending with the polymer and achievement of the required concentration intended, the plastics mixtures can then be further processed to give the desired end products.

EXAMPLES

Each of the examples below uses a metallocene wax or a metallocene wax mixture, produced from metallocene-PE waxes, from polar or nonpolar non-metallocene PE waxes, and from copolymers of ethylene, with the following substance parameters (see below). The products are used in fine-grain form.

The polyolefins a)-d) used in the invention and listed in table 1 were produced by copolymerization of propylene with ethylene using the metallocene catalyst dimethylsilylbisindenylzicronium dichloride by the process stated in EP-A-0 384 264 (general specification of examples 1 to 16). the various softening points and viscosities were set via variation of ethylene usage and of polymerization temperature.

TABLE 1

| Polyolefins used | | | | |
|---|---|---|---|---|
| | Polyolefin a) | Polyolefin b) | Polyolefin c) | Polyolefin d) |
| Softening/drop point (° C.) | 83[1)] | 92[2)] | 93[2)] | 102[2)] |
| Viscosity at 170° C. (mPa · s) | 280 | 2900 | 7900 | 9800 |

| Oxidized, polar PE wax a) or nonpolar PE wax b): | | | | |
|---|---|---|---|---|
| | Drop point [° C.] | Viscosity at 120° C. [mPa · s] | Acid number [mg KOH/g] | Density [g/cm$^3$] |
| a) | about 105 | about 300 | 17 | 0.92 |
| b) | about 118 | about 650 | 0 | 0.92 |

| Copolymer of ethylene: | | | | |
|---|---|---|---|---|
| Softening point [° C.] | Melting point [° C.] | MFR viscosity 190° C./2.16 kg | Ethyl acrylate comonomer % | Density [g/cm$^3$] |
| about 50-60 | about 70-110 | about 0.5-500 g/10 min | about 9-25 | about 0.94 |

[1)]Drop point
[2)]Softening point

The materials are used in fine-grain form (sprayed or ground), but pellet form is also possible (for separate addition of the individual components at the machine).

The active ingredient compositions of the invention were produced as described below:

Extrusion Mixture:
Mixer: Henschel mixer, capacity 5 liters
Mixture: corresponding to the examples listed below
Premixing: at 600 rpm for about 2 to 4 min.

The materials were then extruded in a corotating twin-screw machine with downstream strand pelletizer.
Pellet diameter from 0.8 to 3 mm.

Or for Use in the Form of Dust-Free Mixtures:
Mixer: heating-cooling mixer combination, capacity 5 liters
Mixture: corresponding to the examples listed below
Premixing: at 350 rpm for about 2 min.

Mixing Stage 1) and 2) and Cooling Phase:
1st phase: 3100 rpm T=50° C.-60° C.
Mixing time: about 3 min to 7 min
2nd phase: 1500 rpm T=65° C.-85° C.
Mixing time: about 2 min to 3 min
Mixing with cooling: 20-30° C.
Mixing time: 5 min to 10 min
at 360 rpm Energy was introduced exclusively by way of friction. The average grain size of the resultant mixture was smaller than 1 mm.

Production Examples 1 to 4

The following preparations were produced in the examples below by the process described above. In each case, the metallocene wax used comprised the wax described above:

1) 70% by weight of Hydrocerol CF (composition temperature about 125° C.),
   20% by weight of metallocene wax c)
   10% by weight of oxidized PE wax a)
2) 70% by weight of Hydrocerol CF (composition temperature about 125° C.),
   20% by weight of metallocene wax d)
   10% by weight of nonpolar PE wax b)
3) 70% by weight of Hydrocerol CF (composition temperature about 125° C.),
   30% by weight of metallocene wax b)
4) 70% by weight of Hydrocerol CF (composition temperature about 125° C.),
   20% by weight of metallocene wax a)
   10% by weight of copolymer of ethylene Application Examples The active ingredient compositions of production examples 1 to 4 were cold-batched and used in a corotating twin-screw machine with a low temperature profile to reduce the density of various polymers. The result was a homogeneous foam structure, and at the same time the use of the preparations was not found to impair the mechanical properties of the polymers.

The invention claimed is:

1. An active ingredient composition comprising
   i) one or more finely dispersed blowing agents,
   ii) one or more metallocene polyolefin waxes,
   iii) optionally one or more waxes, wherein the one or more waxes are polar or nonpolar non-metallocene polyolefin waxes, and
   iv) optionally, one or more homo- or copolymers of ethylene or propylene or mixtures thereof,
   where the composition comprises at least 5 to 90% by weight of the one or more blowing agents and at least 10% by weight of the one or more metallocene polyolefin waxes (ii).

2. The composition as claimed in claim 1, wherein the one or more blowing agents are modified azodicarbonamides.

3. The composition as claimed in claim 2, wherein the modified azodicarbonamides are azodicarbonamides in conjunction with kickers.

4. The composition as claimed in claim 3, wherein the kickers are ZnO, zinc stearate or lead salts.

5. The composition as claimed in claim 1, wherein the one or more blowing agents are microspheres having a polymeric shell and which have a filling of gases or of low-boiling-point liquids.

6. The composition as claimed in claim 5, wherein the low-boiling-point liquids are isopentane or isooctane.

7. The composition as claimed in claim 1, wherein the one or more blowing agents are a combination with organic substances, or comprises exothermic blowing agents.

8. The composition as claimed in claim 7, wherein the exothermic blowing agents are 4,4'-oxybis(benzenesulfonyl hydrazide), 5-phenyltetrazole, p-tolylenesulfonyl semicarbazide, or p-tolylenesulfonyl hydrazide.

9. The composition as claimed in claim 1, wherein the one or more metallocene polyolefin waxes comprises at least 50% by weight of polypropylene metallocene wax, based on the weight of the wax fraction.

10. The composition as claimed in claim 1, wherein the one or more metallocene polyolefin waxes and one or more polar or nonpolar non-metallocene polyolefin waxes melt at a temperature in the range from 80 to 170° C.

11. The composition as claimed in claim 1, wherein the drop point of the one or more metallocene polyolefin waxes is in the temperature range from 80 to 170° C. and its melt viscosity, measured at a temperature of 170° C., is in the range from 40 to 80 000 mPa·s.

12. The composition as claimed in claim 1, comprising from 7 to 80% by weight, of the one or more metallocene polyolefin waxes, from 0 to 30% by weight, of the nonpolar non-metallocene polyolefin waxes and/or the one or more homo- or copolymers of ethylene or propylene or mixtures thereof, from 5 to 90% by weight, of the one or more blowing agents, and from 0 to 30% by weight of at least one filler or additive.

13. The composition as claimed in claim 1, wherein the one or more blowing agents are organic or inorganic blowing agents or a mixture thereof.

14. The composition as claimed in claim 1, wherein the one or more blowing agents are one or more endothermic or exothermic blowing agents selected from the group consisting of azodicarbonamides, nitroso compounds, hydrazides, citric acids, citric acid derivatives, citric acid salts, citric acid esters, sodium hydrogencarbonate, and mixtures thereof.

15. The composition as claimed in claim 1, wherein the one or more non-metallocene polyolefin waxes are oxidized waxes, or non-oxidized waxes or mixtures thereof whose drop point is below 135° C. and whose viscosity is smaller than 30 000 mPa·s, measured at 140° C.

16. The composition as claimed in claim 1, further comprising one or more metallocene copolymer waxes composed of propylene and of from 0.1 to 50% by weight of one or more further monomers selected from the group consisting of ethylene and branched or unbranched 1-alkenes having from 4 to 20 carbon atoms.

17. The composition as claimed in claim 1, wherein the composition has very good compatibility with polymers selected from the group consisting of: polyolefins, ethylene-vinyl acetate copolymers (EVA), polystyrene (PS), styrene-acrylonitrile copolymers (SAN), acrylonitrile-butadiene-styrene copolymers (ABS), polyvinyl chloride (PVC), polyamide (PA), polyethylene glycol terephthalate (PET), polybutylene glycol terephthalate (PBT), copolyesters thereof polycarbonate (PC), and certain specialty polymers.

18. The composition as claimed in claim 1, wherein the drop point of the one or more metallocene polyolefin waxes is in the temperature range from 80 to 170° C. and its melt viscosity, measured at a temperature of 170° C., is in the range from 45 to 35 000 mPa·s.

19. The composition as claimed in claim 1, wherein the drop point of the one or more metallocene polyolefin waxes is in the temperature range from 80 to 170° C. and its melt viscosity, measured at a temperature of 170° C., is in the range from 50 to 10 000 mPa·s.

20. The composition as claimed in claim 1, comprising from 7.5 to 75% by weight, of the one or more metallocene polyolefin waxes, from 0.5 to 25% by weight, of the nonpolar non-metallocene polyolefin waxes and/or the one or more homo- or copolymers of ethylene or propylene or mixtures thereof, from 25 to 85% by weight, of the one or more blowing agents, and from 0 to 30% by weight of at least one filler or additive.

21. A process for the production of a composition as claimed in claim 1, comprising the steps of cold-mixing the individual components and homogenizing the individual components in an extruder or kneader to form a mixture.

22. The process as claimed in claim 21, wherein the individual components are in the form of pellets, flakes, powders, or in the form of a fine-grain mixture.

23. The process as claimed in claim 21, wherein the one or more blowing agents are in liquid form.

24. The process as claimed in claim 21, wherein, after the homogenization the mixture is pelletized by a hot-cut strand pelletizer, a die-face pelletizer or underwater pelletizer.

25. A foamed plastic part foamed by an active ingredient composition as claimed in claim 1.

* * * * *